(12) United States Patent
Maehara et al.

(10) Patent No.: US 9,882,203 B2
(45) Date of Patent: Jan. 30, 2018

(54) ALKALINE BATTERY AND METHOD FOR MANUFACTURING ALKALINE BATTERY

(71) Applicant: PRIMEARTH EV ENERGY CO., LTD., Kosai-shi, Shizuoka (JP)

(72) Inventors: Kenichi Maehara, Kosai (JP); Kazuki Nakano, Toyohashi (JP); Hiroyuki Sakamoto, Toyohashi (JP)

(73) Assignee: PRIMEARTH EV ENERGY CO., LTD., Kosai-shi (JP)

( * ) Notice: Subject to any disclaimer, the term of this patent is extended or adjusted under 35 U.S.C. 154(b) by 206 days.

(21) Appl. No.: 14/839,935

(22) Filed: Aug. 29, 2015

(65) Prior Publication Data

US 2016/0240855 A1    Aug. 18, 2016

(30) Foreign Application Priority Data

Feb. 16, 2015    (JP) .................. 2015-027331

(51) Int. Cl.
| | |
|---|---|
| *H01M 4/32* | (2006.01) |
| *H01M 10/26* | (2006.01) |
| *H01M 10/30* | (2006.01) |
| *H01M 4/29* | (2006.01) |
| *H01M 4/62* | (2006.01) |

(Continued)

(52) U.S. Cl.
CPC ............. *H01M 4/32* (2013.01); *H01M 4/29* (2013.01); *H01M 4/366* (2013.01); *H01M 4/62* (2013.01); *H01M 10/26* (2013.01); *H01M 10/30* (2013.01); *H01M 10/446* (2013.01); *Y02E 60/124* (2013.01); *Y02P 70/54* (2015.11)

(58) Field of Classification Search
CPC .................. H01M 4/32; H01M 4/52
See application file for complete search history.

(56) References Cited

U.S. PATENT DOCUMENTS

| | | |
|---|---|---|
| 2001/0044050 A1 | 11/2001 | Hayashi et al. |
| 2002/0172863 A1 | 11/2002 | Ogasawara et al. |

(Continued)

FOREIGN PATENT DOCUMENTS

| | | |
|---|---|---|
| JP | H06-215763 A | 5/1994 |
| JP | H09-073901 A | 3/1997 |

(Continued)

OTHER PUBLICATIONS

JP Office Action dated Nov. 29, 2017 in application No. 2015-027731.

*Primary Examiner* — Matthew J Merkling
(74) *Attorney, Agent, or Firm* — Maschoff Brennan

(57) ABSTRACT

A method for manufacturing an alkaline battery includes assembling an alkaline battery with a positive electrode, a negative electrode, a separator, and an electrolyte. The positive electrode includes cobalt and a positive electrode active material particle, which has a main component that is nickel hydroxide. The positive electrode active material particle has a coating layer that includes cobalt oxyhydroxide. At least one of the positive electrode, the negative electrode, and the electrolyte includes a tungsten element. The method further includes charging the assembled alkaline battery so that the cobalt in the positive electrode is deposited as cobalt oxyhydroxide on a surface of the positive electrode active material particle.

4 Claims, 3 Drawing Sheets

(51) Int. Cl.
*H01M 4/36* (2006.01)
*H01M 10/44* (2006.01)

(56) References Cited

U.S. PATENT DOCUMENTS

| | | | | |
|---|---|---|---|---|
| 2004/0265689 A1* | 12/2004 | Ochi | ................ | H01M 4/32 429/206 |
| 2005/0026039 A1* | 2/2005 | Ito | ................ | C01G 51/04 429/223 |
| 2009/0202909 A1 | 8/2009 | Sakamoto et al. | | |
| 2015/0180101 A1* | 6/2015 | Harada | ................ | H01M 16/00 429/9 |

FOREIGN PATENT DOCUMENTS

| JP | 2001-297758 A | 10/2001 |
|---|---|---|
| JP | 2002-260720 A | 9/2002 |
| JP | 2002-304991 A | 10/2002 |
| JP | 4736372 B2 | 7/2011 |

\* cited by examiner

ALKALINE BATTERY AND METHOD FOR MANUFACTURING ALKALINE BATTERY

CROSS-REFERENCE TO RELATED APPLICATIONS

This application is based upon and claims the benefit of priority from prior Japanese Patent Application No. 2015-027331, filed on Feb. 16, 2015, the entire contents of which are incorporated herein by reference.

FIELD

This disclosure relates to a method for manufacturing an alkaline battery and to an alkaline battery.

BACKGROUND

Various types of alkaline batteries (rechargeable batteries) are used as power supplies for portable electronic devices and as power supplies for electric vehicles and hybrid vehicles. One type of such an alkaline battery is a nickel-metal hydride battery, which has high energy density and superior reliability. Japanese Patent No. 4736372 describes one example of a nickel-metal hydride battery.

The nickel-metal hydride battery of Japanese Patent No. 4736372 increases the utilization ratio of the positive electrode by covering the surface of nickel hydroxide particles, which form the positive electrode active material, with a cobalt compound layer, the main component of which is cobalt oxyhydroxide.

SUMMARY

Since there is a demand for alkaline batteries having a higher output, research and development have been conducted to further decrease the internal resistance of the battery. The internal resistance of a battery is affected by the contact of the active material with the collector and by the resistance of the electrolyte. In addition, there is a demand for further increasing the conductivity of a conductive network formed in the positive electrode.

It is an object to provide a method for manufacturing an alkaline battery that decreases the internal resistance by increasing the conductivity of a conductive network, the main component of which is cobalt oxyhydroxide. It is a further object to provide such an alkaline battery.

One aspect of the present invention is a method for manufacturing an alkaline battery. The method includes assembling an alkaline battery with a positive electrode, a negative electrode, a separator, and an electrolyte. The positive electrode includes cobalt and a positive electrode active material particle, which has a main component that is nickel hydroxide. The positive electrode active material particle has a coating layer that includes cobalt oxyhydroxide. At least one of the positive electrode, the negative electrode, and the electrolyte includes a tungsten element. The method further includes charging the assembled alkaline battery so that the cobalt in the positive electrode is deposited as cobalt oxyhydroxide on a surface of the positive electrode active material particle.

A further aspect of the present invention is an alkaline battery provided with a positive electrode including a positive electrode active material particle, which has a main component that is nickel hydroxide, a negative electrode, a separator, and an electrolyte. The positive electrode includes the positive electrode active material particle, which has a coating layer that includes cobalt oxyhydroxide, and cobalt oxyhydroxide derived from cobalt, which is oxidized in an initial charging. The cobalt oxyhydroxide included in the positive electrode has a peak in a (012) plane around "$2\theta=37°$ to $40°$" in an X-ray diffraction using CuK$\alpha$ radiation, and the peak has a half-width of 0.59° or greater. At least one of the positive electrode, the negative electrode, and the electrolyte includes a tungsten element.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

One embodiment of an alkaline battery and a method for manufacturing the alkaline battery will now be described. In the present embodiment, the alkaline battery is a nickel-metal hydride battery. The nickel-metal hydride battery includes a positive electrode, which uses nickel hydroxide ($Ni(OH)_2$) as a positive electrode active material, and a negative electrode, which uses a hydrogen-absorbing alloy, as a negative electrode active material.

Figure 1:
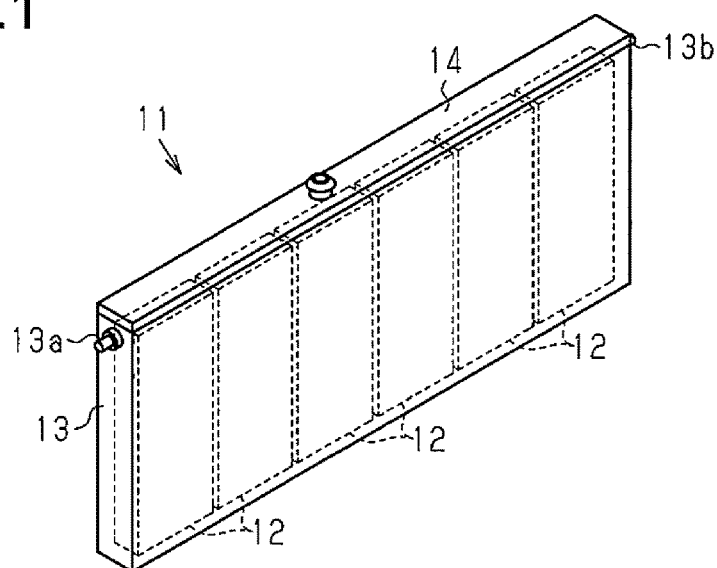
FIG. 1 is a perspective view illustrating one embodiment of a nickel-metal hydride battery, which is an example of an alkaline battery.

Referring to FIG. 1, a nickel-metal hydride battery 11 is a prismatic sealed battery, and includes an integrated battery container 13, which can accommodate battery cells 12, and a lid 14, which closes an opening of the integrated battery container 13. The battery container 13 and the lid 14 are formed from a resin material. In the present embodiment, the integrated battery container 13 accommodates six battery cells 12, which are electrically connected in series. Power is output from the battery cells 12 through a positive electrode terminal 13a and a negative electrode terminal 13b, which are arranged on the integrated battery container 13.

Figure 2:
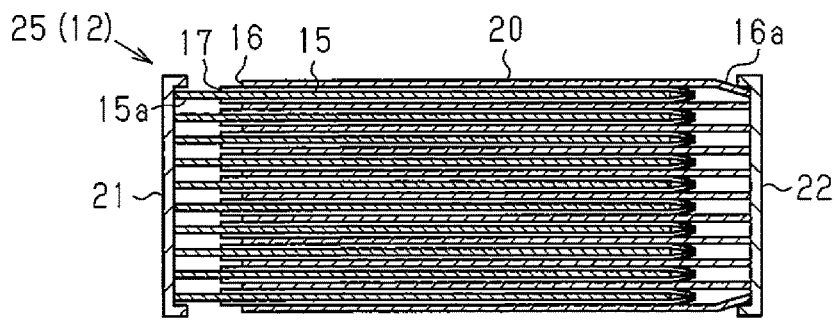
FIG. 2 is a cross-sectional view of a stacked body arranged in the nickel-metal hydride battery of FIG. 1.

As illustrated in FIG. 2, each battery cell 12 includes a stacked body 25 and an electrolyte (not illustrated), which is accommodated in the integrated battery container 13 together with the stacked body 25. The stacked body 25 includes an electrode plate unit 20, a positive electrode collector plate 21, and a negative electrode collector plate 22. The electrode plate unit 20 includes positive electrode plates 15, negative electrode plates 16, and separators 17. The positive electrode plates 15 and the negative electrode plates 16 are stacked with the separators 17 arranged in between. Each positive electrode plate 15 includes an end 15a coupled to a coupling surface of the positive electrode collector plate 21. Each negative electrode plate 16 includes an end 16a coupled to a coupling surface of the negative electrode collector plate 22.

The negative electrode plates 16 will now be described. Each negative electrode plate 16 includes a core and a hydrogen-absorbing alloy supported by the core. Although the type of the hydrogen-absorbing alloy is not particularly limited, the hydrogen-absorbing alloy may be, for example, an alloy of mischmetal, which is an alloy of rare earth elements, and nickel. Alternatively, some of the alloy of the mischmetal and nickel may be replaced by a metal such as aluminum, cobalt, or manganese. The negative electrode plate 16 is formed by preparing a paste of hydrogen-absorbing alloy to which a thickening agent (carbon black etc.) and a binding agent (styrene-butadiene copolymer etc.) are added. The alloy paste is then applied to a core such as a punching metal. Then, the punching metal is dried, rolled, and cut.

The electrolyte will now be described. The electrolyte is held in the separators 17 and transfers ions between the positive electrode plate 15 and the negative electrode plate 16.

The electrolyte is an alkaline solution that uses water as a solvent and of which the main component is potassium hydroxide (KOH). Further, the electrolyte includes at least tungsten elements (W). Tungsten elements are included in tungsten compounds that are the solute of the electrolyte.

One example of a tungsten compound, which is the solute of the electrolyte, is a tungsten oxide (WxOy, where x and y are real numbers) such as $WO_2$, $WO_3$, or $W_2O_5$. Further, tungsten oxide hydrate such as $WO_3.H_2O$ or $W_2O_5.H_2O$, may be used as a tungsten compound. Other examples of a tungsten compound that may be used include $ZrW_2O_8$, $Al_2(WO_4)_3$, WC, $CaWO_4$, $FeWO_4$, $MnWO_4$, $WCl_6$, $WBr_6$, $WCl_2F_4$, $W(CO)_6$, $WO_2Cl_2$, $Li_2WO_2$, $H_2WO_4$, $K_2WO_4$, $Na_2WO_4$, $Li_2WO_4.2H_2O$, $H_2WO_4.2H_2O$, $K_2WO_4.2H_2O$, $Na_2WO_4 \cdot 2H_2O$, $(NH_4)_3PO_4.12WO_3.3H_2O$, $Na_3(PO_4.12WO_3).xH_2O$, $WF_5$, and $WF_6$.

The positive electrode plate 15 will now be described.

The positive electrode plate 15 includes a base material, which is formed by a three-dimensional porous body, and a positive electrode mixing material, which is supported by the base material. The base material functions as a carrier, which supports a filler, and also functions as a collector. The positive electrode mixing material includes positive electrode active material particles, cobalt (Co), a thickening agent, a binding agent, and the like. The main component of the positive electrode active material particles is nickel hydroxide. Cobalt (Co) is a metal that functions as a conductive material.

The positive electrode active material particles each include a nickel hydroxide particle and a coating layer, which is applied to the surface of the nickel hydroxide particle. The main component of the coating layer is cobalt oxyhydroxide (CoOOH). The positive electrode plate 15 is formed using cobalt oxyhydroxide having a β-type crystalline structure. When the nickel-metal hydride battery, which uses the positive electrode plate 15, is initially charged, or charged for the first time after being assembled, the crystallinity of the β-type cobalt oxyhydroxide changes and decreases the resistance of the cobalt oxyhydroxide. In the coating layer of each positive electrode material particle, a conductive network formed in the positive electrode connects the nickel hydroxide particles to one another. The conductive network also connects the nickel hydroxide particles to the base material.

When the nickel-metal hydride battery is initially charged (may be simply referred to as charged), the cobalt in the positive electrode mixed material is electrochemically oxidized and deposited as cobalt oxyhydroxide. The deposition of the cobalt oxyhydroxide, which is generated by the oxidation of cobalt, between the positive electrode active material particles and between the base material and the positive electrode active material particles fills the gaps between the positive electrode active material particles and between the base material and the positive electrode active material particles. Thus, the coating layer of each positive electrode active material particle includes cobalt oxyhydroxide that exists in the coating layer from before the initial charging and cobalt oxyhydroxide derived from cobalt. This reduces gaps between the positive electrode active material particles and the gaps between the base material and the positive electrode active material particles. Thus, the coating layer of each positive electrode active material is a high density cobalt oxyhydroxide layer. The coating layer forms a conductive network that increases the utilization ratio of the positive electrode active material. The utilization ratio of the positive electrode active material is expressed as the ratio of the discharged capacitance relative to a theoretical capacitance obtained from the product of the weight of the positive electrode active material and an active material theoretical capacitance. Cobalt oxyhydroxide is stable in the operation voltage range of the nickel-metal hydride battery. Thus, as long as the nickel-metal hydride battery is operated within the operational voltage range, cobalt oxyhydroxide is not reduced to cobalt.

Cobalt oxyhydroxide that is derived from cobalt has a high crystallinity and therefore a low conductivity. Thus, although gaps may be filled with cobalt oxyhydroxide that exists in the coating layer from before the initial charging and cobalt oxyhydroxide derived from cobalt, there is still room for improvement in the conductivity of cobalt oxyhydroxide.

In this regard, the inventors of the present invention have conducted studies and found that under the existence of tungsten elements, the crystallinity of cobalt oxyhydroxide decreases when cobalt is oxidized and cobalt oxyhydroxide is deposited.

When oxidizing cobalt and depositing cobalt oxyhydroxide, tungsten compound ions, such as tungstate ions, that accelerate the oxidation of cobalt and exist between the positive electrode active material particles and between the base material and the positive electrode active material particles disturb the originating points (nucleus) of crystal growth and lowers the crystallinity.

Even when included in the electrolyte or the like, tungsten elements do not hinder battery reactions or adversely affect the discharging characteristics and the cycle life of the battery. Thus, when charging the nickel-metal hydride battery provided with electrolyte that includes tungsten elements and the positive electrode, which includes positive electrode active material particles covered by cobalt hydroxide, and cobalt, a conductive network having high conductivity is formed in the positive electrode. This lowers the internal resistance of the nickel-metal hydride battery.

The inventors have also learned through studies that tungsten elements in the electrolyte function to hinder the electrolysis of water when charging and discharging are performed under a high temperature. When the nickel-metal hydride battery is charged or discharged under a high temperature, the electrolysis of water generates oxygen and hydrogen. The hydrogen may permeate and leak out of the integrated battery container 13 and the lid 14, which are formed from a resin. When hydrogen leaks and the hydrogen atoms in the integrated battery container 13 become insufficient, the capacitance decreases in the negative electrode that includes the hydrogen-absorbing alloy. Since tungsten elements hinder the electrolysis of the water included in the electrolysis, capacitance decrease that may be caused by insufficient hydrogen atoms is limited in the negative electrode.

In an X-ray diffraction using CuKα radiation, the positive electrode active material particles including the cobalt oxyhydroxide deposited when oxidizing cobalt has a peak derived from a (012) plane of cobalt oxyhydroxide around "$2\theta=37°$ to $40°$". The half-width of the (012) plane peak of cobalt oxyhydroxide is 0.59° or greater.

Generally, the half-width of a peak obtained through X-ray diffraction infers the size of a crystallite and the distortion of a crystal. Further, the half-width of a peak unique to cobalt oxyhydroxide has a correlation with crystallinity, which is the distortion of crystals. More specifically, a smaller half-width of a peak decreases the distortion of crystals and increases the crystallinity, and a larger half-width of a peak increases the distortion of crystals and decreases the crystallinity.

Figure 3:
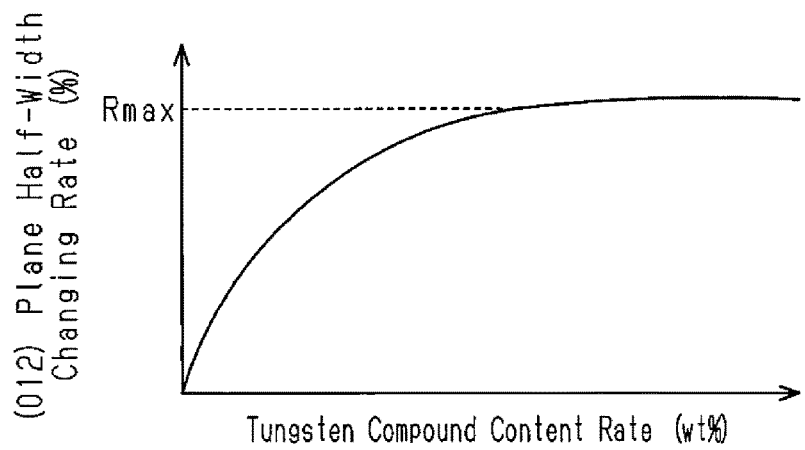
FIG. 3 is a graph schematically illustrating a half-width change rate of a peak derived from a (012) plane of cobalt oxyhydroxide obtained through an X-ray diffraction measurement when changing the content rate of a tungsten compound in an electrolyte.

As schematically illustrated in FIG. 3, the content rate of tungsten compounds relative to the weight of the positive electrode active material changes the half-width of a peak derived from a (012) plane of cobalt oxyhydroxide in the coating layer. In the graph of FIG. 3, the horizontal axis represents the content rate of tungsten compounds, and the vertical axis represents the changing rate of the half-width of peak derived from a (012) plane. A value obtained by dividing a difference $\Delta WH$ (i.e., $WH2-WH1$) of a half-width $WH2$ of a nickel-metal hydride battery using an electrolyte that includes tungsten compounds and a half-width $WH1$ of a nickel-metal hydride battery using an electrolyte that includes tungsten compounds by the half-width $WH1$ and represented in percentage (i.e., $(\Delta WH/WH1)\cdot 100$) indicates the changing rate of the half-width of peak derived from a (012) plane. An increase in the content rate of tungsten compounds is apt to increasing the half-width changing rate of the (012) plane peak.

When the nickel hydroxide particles do not include coating layers, the half-width of a (012) plane peak is small even when the electrolyte includes tungsten elements and the positive electrode includes cobalt oxyhydroxide derived from cobalt. More specifically, the crystallinity of cobalt oxyhydroxide derived from cobalt decreases when the active material paste of the positive electrode includes, in advance, cobalt oxyhydroxide, which exists in the coating layer prior to initial charging, and cobalt, while the electrolyte includes tungsten elements. The crystallinity of cobalt oxyhydroxide derived from cobalt does not decrease when the nickel hydroxide particles do not have the cobalt oxyhydroxide coating layer.

Figure 4:
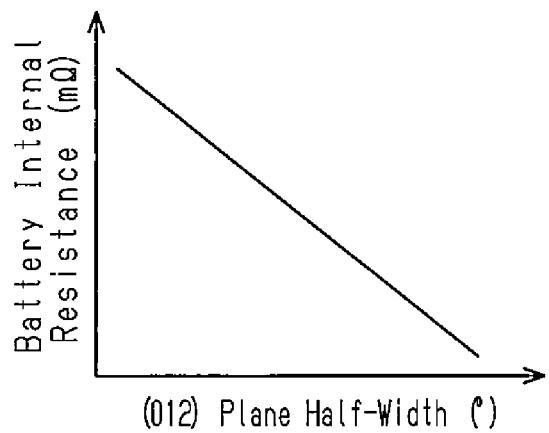
FIG. 4 is a graph schematically illustrating the battery internal resistance when changing the half-width of a peak derived from a (012) plane of cobalt oxyhydroxide.

As illustrated schematically in FIG. 4, an increase in the half-width of a peak derived from a cobalt oxyhydroxide (012) plane is apt to decreasing the internal resistance of a nickel-metal hydride battery.

In a nickel-metal hydride battery prior to initial charging, the preferred ratio of the weight W2 of cobalt relative to the weight W1 of the β-type cobalt oxyhydroxide in the coating layer (W2/W1) is 0.2 or greater and 1.0 or less. When the weight ratio of cobalt relative to the weight W1 of the β-type cobalt oxyhydroxide is less than 0.2, the gaps of the coating layer are not sufficiently filled by the cobalt oxyhydroxide derived from cobalt. When the weight ratio of cobalt relative to the weight W1 of the β-type cobalt oxyhydroxide exceeds 1.0, the cobalt corresponding to the amount exceeding 1.0 does not contribute to the formation of a conductive network.

When the tungsten compound added to the electrolyte is tungsten oxide ($WO_3$), the preferred content rate of the oxide tungsten relative to the weight of nickel hydroxide, which is the positive electrode active material, is 0.2 weight percent or greater and 4.0 weight percent. When the content rate of tungsten oxide is in this range, an increase in the content rate of tungsten oxide increases the half-width of the (012) plane. When the content rate of tungsten oxide exceeds 4.0 weight percent, the tungsten oxide exceeds the amount used to change the crystallinity of cobalt. Thus, subsequent to charging, some of the tungsten oxide remains in the electrolyte. The tungsten elements remaining in the electrolyte form resistance components that increase the resistance of the battery. Thus, it is preferred that the content rate of tungsten oxide not exceed 4.0 weight percent. When adding a tungsten compound other than tungsten oxide, the same results are obtained when the amount of the tungsten compound exceeds the amount used to change the crystallinity of cobalt.

A method for manufacturing the nickel-metal hydride battery will now be described. The manufacturing method includes a positive electrode formation step, a negative electrode formation step, an assembling step, and a cobalt charging step.

In the positive electrode formation step, a predetermined amount of cobalt and a thickening agent is added to and kneaded with the positive electrode active material particles, which have coating layers, to form the positive electrode active material paste. In this stage, the cobalt oxyhydroxide in the coating layers is the β-type cobalt oxyhydroxide.

The positive electrode active material paste is added to a nickel foam base material and dried. A base material including the active material paste is pressurized and molded to a predetermined size. Then, the base material is cut to form the positive electrode plates 15.

In the negative electrode formation step, hydrogen-absorbing alloy particles are immersed and agitated in an alkaline solution. Then, the hydrogen-absorbing alloy particles are washed with water and dried. Further, a binding agent is added to the dried hydrogen-absorbing alloy particles and kneaded to form a negative electrode active material paste. The negative electrode active material paste is applied to a core, such as a punching metal, and dried. Then, the core including the active material paste is rolled and cut to form the negative electrode plates 16.

In the assembling step, the positive electrode plates 15 and the negative electrode plates 16 are stacked with the separators arranged in between, which are formed by non-woven cloths of an alkaline resistant resin. The end 15a of each positive electrode plate 15 is joined with the collector plate 21 through welding or the like, and the end 16a of each negative electrode plate 16 is joined with the collector plate 22 through welding or the like. This forms the stacked body 25. Further, the stacked body 25 is accommodated in the integrated battery container 13 together with the electrolyte, which is prepared by adding tungsten compound to a liquid including a solute of which the main component is potassium hydroxide.

In the cobalt charging step, the nickel-metal hydride battery is charged to electrochemically oxidize the cobalt in the positive electrode mixing material so that cobalt oxyhydroxide is deposited.

It the cobalt charging step, it is preferred that the assembled nickel-metal hydride battery, which has not undergone initial charging, be charged at a constant current of 0.1 A or greater and 2.0 A or less for one hour or longer and five hours or less. By charging the nickel-metal hydride battery under this condition, the resistance reduction of the β-type cobalt oxyhydroxide and the deposition of the cobalt oxyhydroxide are performed in a preferred manner.

The nickel-metal hydride battery that is formed as described above forms a fine conductive network having high conductivity in the positive electrode. This decreases the internal resistance and allows for the output and input of large currents. Thus, the nickel-metal hydride battery is optimal for use as a power supply for an electric vehicle or a hybrid vehicle.

Examples 1 to 7, examples 11 to 17, comparative examples 1 to 8, and comparative examples 11 to 18 will now be described.

Example 1

An X-ray diffraction using CuKα radiation was performed to measure the half-width of a peak derived from a (012) plane of cobalt oxyhydroxide obtained near "2θ=37° to 40°". In this case, when nickel hydroxide is included in the sample, the half-width of the peak in the (012) plane of the cobalt oxyhydroxide overlaps the peak of the nickel hydroxide. Thus, the half-width of the peak in the (012) plane of the cobalt oxyhydroxide cannot be measured. For this reason, to measure the half-width of the peak in the (012) plane of the cobalt oxyhydroxide, a positive electrode similar to the above embodiment but not including nickel hydroxide was prepared as a sample.

Then, β-type cobalt oxyhydroxide, cobalt, water, and a thickening agent such as carboxymethylcellulose (CMC) was added and kneaded to form a positive electrode active material paste. The weight of the cobalt oxyhydroxide was set to "0.5", and the weight of cobalt was set to "0.3". The paste was applied to a nickel foam base material and dried. Then, the base material was pressurized and molded to form positive electrode plates. When actually forming the positive electrode active material, the weight ratio of nickel hydroxide is set to "10".

A predetermined amount of hydrogen-absorbing alloy particles formed by an alloy of mischmetal and nickel was applied to a core formed by a punching metal to obtain the negative electrode plates 16.

The positive electrode plates 15 and the negative electrode plates 16 were stacked with the separators 17 arranged in between, which were formed by non-woven cloths of an alkaline resistant resin. Then, the positive electrode plates 15 and the negative electrode plates 16 were welded to the collector plates 21 and 22 to obtain the stacked body 25.

The electrolyte was prepared by adding tungsten oxide ($WO_3$) to an alkaline solution of which the main component was potassium hydroxide and of which the specific gravity was 1.2. The content rate of the tungsten oxide was set to 0.2 weight percent relative to the weight of the nickel hydroxide, which is the originally intended additive.

Further, the stacked body 25 was accommodated in a case to assemble the battery. The battery was connected to a charger and charged at 0.75 A for 2.5 hours.

Example 2

In example 2, a battery was formed by setting the content rate of the tungsten oxide in the electrolyte to 0.5 weight percent. Otherwise, the battery of example 2 was the same as the battery of example 1.

Example 3

In example 3, a battery was formed by setting the content rate of the tungsten oxide in the electrolyte to 1.5 weight percent. Otherwise, the battery of example 3 was the same as the battery of example 1.

Example 4

In example 4, a battery was formed by setting the content rate of the tungsten oxide in the electrolyte to 2.0 weight percent. Otherwise, the battery of example 4 was the same as the battery of example 1.

Example 5

In example 5, a battery was formed by setting the content rate of the tungsten oxide in the electrolyte to 3.0 weight percent. Otherwise, the battery of example 5 was the same as the battery of example 1.

Example 6

In example 6, a battery was formed by setting the content rate of the tungsten oxide in the electrolyte to 4.0 weight percent. Otherwise, the battery of example 6 was the same as the battery of example 1.

Example 7

In example 7, a battery was formed by setting the content rate of the tungsten oxide in the electrolyte to 5.0 weight percent. Otherwise, the battery of example 7 was the same as the battery of example 1.

Examples 11 to 17 of a nickel-metal hydride battery formed using nickel hydroxide, which is a positive electrode active material, will now be described. In examples 11 to 17, the weight ratio of the cobalt oxyhydroxide in the coating layer and cobalt and the content rate of the tungsten oxide in the electrolyte were set to be the same as examples 1 to 7.

Example 11

In example 11, a battery was formed by setting the weight ratio of cobalt oxyhydroxide and cobalt and the content rate of tungsten oxide in the electrolyte. Otherwise, the battery of example 11 was the same as example 1.

More specifically, the weight of nickel hydroxide particles was set to "10" and the weight of the β-type cobalt oxyhydroxide coating the nickel hydroxide particles was set to "0.5" to prepare the positive electrode active material particles. The weight of the cobalt oxyhydroxide in the coating layer may be measured by conducting an ICP analysis.

Cobalt, water, and a thickening agent such as carboxymethylcellulose was added to the positive electrode active material particles and kneaded to form a positive electrode active material paste. The weight of the cobalt oxyhydroxide was set to "10", and the weight of the cobalt in the positive electrode active material was set to "0.3".

The content rate of the tungsten oxide in the electrolyte was set to 0.2 weight percent. The positive electrode plates 15 and the negative electrode plates 16 were formed in the same manner as example 1. The positive electrode plates 15 and the negative electrode plates 16 were stacked with the separators 17 arranged in between, which were formed by non-woven cloths of an alkaline resistant resin, and the positive electrode plates 15 and the negative electrode plates 16 were welded to the collector plates 21 and 22 to obtain the stacked body 25. Further, the stacked body 25 was used to assemble the nickel-metal hydride battery. The battery was connected to a charger and charged at 0.75 A for 2.5 hours.

Example 12

In example 12, a nickel-metal hydride battery was formed by setting the content rate of the tungsten oxide in the electrolyte to 0.5 weight percent, which is the same as example 2. Otherwise, the nickel-metal hydride battery of example 12 was the same as that of example 11.

Example 13

In example 13, a nickel-metal hydride battery was formed by setting the content rate of the tungsten oxide in the electrolyte to 1.5 weight percent, which is the same as example 3. Otherwise, the nickel-metal hydride battery of example 13 was the same as that of example 11.

Example 14

In example 14, a nickel-metal hydride battery was formed by setting the content rate of the tungsten oxide in the electrolyte to 2.0 weight percent, which is the same as example 4. Otherwise, the nickel-metal hydride battery of example 14 was the same as that of example 11.

Example 15

In example 15, a nickel-metal hydride battery was formed by setting the content rate of the tungsten oxide in the electrolyte to 3.0 weight percent, which is the same as example 5. Otherwise, the nickel-metal hydride battery of example 15 was the same as that of example 11.

Example 16

In example 16, a nickel-metal hydride battery was formed by setting the content rate of the tungsten oxide in the electrolyte to 4.0 weight percent, which is the same as example 6. Otherwise, the nickel-metal hydride battery of example 16 was the same as that of example 11.

Example 17

In example 17, a nickel-metal hydride battery was formed by setting the content rate of the tungsten oxide in the electrolyte to 5.0 weight percent, which is the same as example 7. Otherwise, the nickel-metal hydride battery of example 17 was the same as that of example 11.

Comparative Example 1

In comparative example 1, a battery was formed without adding the β-type cobalt oxyhydroxide to the positive electrode active material and by setting the content rate of tungsten oxide to 0 weight percent. Otherwise, the battery of comparative example 1 was the same as example 1. More specifically, in comparative example 1, the positive electrode active material paste included cobalt, water, and a thickening agent but did not include nickel hydroxide and cobalt oxyhydroxide. In this case, subsequent to the initial charging, cobalt was oxidized, and cobalt oxyhydroxide was deposited.

Comparative Example 2

In comparative example 2, a battery was formed without adding the β-type cobalt oxyhydroxide to the positive electrode active material paste. Otherwise, the battery of comparative example 2 was the same as example 2.

Comparative Example 3

In comparative example 3, a battery was formed without adding the β-type cobalt oxyhydroxide to the positive electrode active material paste. Otherwise, the battery of comparative example 3 was the same as example 3.

Comparative Example 4

In comparative example 4, a battery was formed without adding the β-type cobalt oxyhydroxide to the positive electrode active material paste. Otherwise, the battery of comparative example 4 was the same as example 4.

Comparative Example 5

In comparative example 5, a battery was formed without adding the β-type cobalt oxyhydroxide to the positive electrode active material paste. Otherwise, the battery of comparative example 5 was the same as example 5.

Comparative Example 6

In comparative example 6, a battery was formed without adding the β-type cobalt oxyhydroxide to the positive electrode active material paste. Otherwise, the battery of comparative example 6 was the same as example 6.

Comparative Example 7

In comparative example 7, a battery was formed without adding the β-type cobalt oxyhydroxide to the positive electrode active material paste. Otherwise, the battery of comparative example 7 was the same as example 7.

Comparative Example 8

In comparative example 8, a battery was formed without adding the β-type cobalt oxyhydroxide to the positive electrode active material paste and by setting the content rate of tungsten oxide to 0 weight percent. Otherwise, the battery of comparative example 8 was the same as example 1.

Then, in comparative examples 11 to 17, nickel-metal hydride batteries were formed without adding the β-type cobalt oxyhydroxide to the positive electrode active material paste. Further, the nickel-metal hydride batteries of comparative examples 11 to 17 were formed by setting the content rate of the tungsten oxide in the electrolyte to be the same as comparative examples 1 to 7 and by using nickel hydroxide, which is a positive electrode active material.

Comparative Example 11

In comparative example 11, a nickel-metal hydride battery was formed without adding the β-type cobalt oxyhydroxide to the positive electrode active material paste and by setting the content rate of the tungsten oxide in the electrolyte to be the same as comparative example 1. Otherwise, the nickel-metal hydride battery of comparative example 11 was the same as that of example 11.

Comparative Example 12

In comparative example 12, a nickel-metal hydride battery was formed without adding the β-type cobalt oxyhydroxide to the positive electrode active material paste and by setting the content rate of the tungsten oxide in the electrolyte to be the same as comparative example 2. Otherwise, the nickel-metal hydride battery of comparative example 12 was the same as that of example 11.

Comparative Example 13

In comparative example 13, a nickel-metal hydride battery was formed with the weight ratio of nickel hydroxide and cobalt and the content rate of the tungsten oxide in the electrolyte set to be the same as comparative example 3. Otherwise, the nickel-metal hydride battery of comparative example 13 was the same as that of example 11.

Comparative Example 14

In comparative example 14, a nickel-metal hydride battery was formed with the weight ratio of nickel hydroxide and cobalt and the content rate of the tungsten oxide in the electrolyte set to be the same as comparative example 4. Otherwise, the nickel-metal hydride battery of comparative example 14 was the same as that of example 11.

Comparative Example 15

In comparative example 15, a nickel-metal hydride battery was formed with the weight ratio of nickel hydroxide and cobalt and the content rate of the tungsten oxide in the electrolyte set to be the same as comparative example 5. Otherwise, the nickel-metal hydride battery of comparative example 15 was the same as that of example 11.

Comparative Example 16

In comparative example 16, a nickel-metal hydride battery was formed with the weight ratio of nickel hydroxide and cobalt and the content rate of the tungsten oxide in the electrolyte set to be the same as comparative example 6. Otherwise, the nickel-metal hydride battery of comparative example 16 was the same as that of example 11.

Comparative Example 17

In comparative example 17, a nickel-metal hydride battery was formed with the weight ratio of nickel hydroxide and cobalt and the content rate of the tungsten oxide in the electrolyte set to be the same as comparative example 7. Otherwise, the nickel-metal hydride battery of comparative example 17 was the same as that of example 11.

Comparative Example 18

In comparative example 18, a battery was formed without adding the β-type cobalt oxyhydroxide to the active material paste and by setting the content rate of tungsten oxide to 0 weight percent. Otherwise, the nickel-metal hydride battery of comparative example 18 was the same as that of example 1.

(Evaluation)

The paste portions of the positive electrode plates 15 were removed from the initially charged nickel-metal hydride batteries of examples 1 to 7 and comparative examples 1 to 7 to perform an X-ray diffraction measurement using CuKα radiation to check the half-width of the peak in the (012) plane located "2θ=37° to 40°".

The measurement conditions are as listed below.
<X-Ray Diffraction Measurement Conditions>
Device: X'Pert-Pro MPD, manufactured by PANalytical
X-Ray: CuKα, 45 kV, 40 mA
Slit: SS=0.04 rad, DS=0.5°
Scan Mode: continuous
Step Size: 0.017°
Time per Step: 50 sec
Scan Speed: 0.042°/sec In FIG. 5, curve L10 was plotted for examples 1 to 7 along data points P1 to P7 defined by the content rate of tungsten oxide and the change rate of the half-width of a peak derived from a (012) plane. Data points P1 to P7 correspond to examples 1 to 7, respectively. The change rate of the half-width of a peak derived from a (012) plane is based on the half-width of a battery using an electrolyte that does not include tungsten oxide (corresponding to comparative example 1).

In examples 1 to 7, the half-width change rate increases as the content rate of tungsten oxide increases. In examples 6 and 7, the half-width change rate becomes about the same. The tungsten elements remaining in the electrolyte form resistance components that increase the resistance of the battery. Thus, it is preferred that the content rate of tungsten oxide be set so that tungsten elements do not remain in the electrolyte. In this regard, it is preferred that the content rate of tungsten oxide be 0.2 weight percent or greater and 4.0 weight percent or less.

Figure 5:
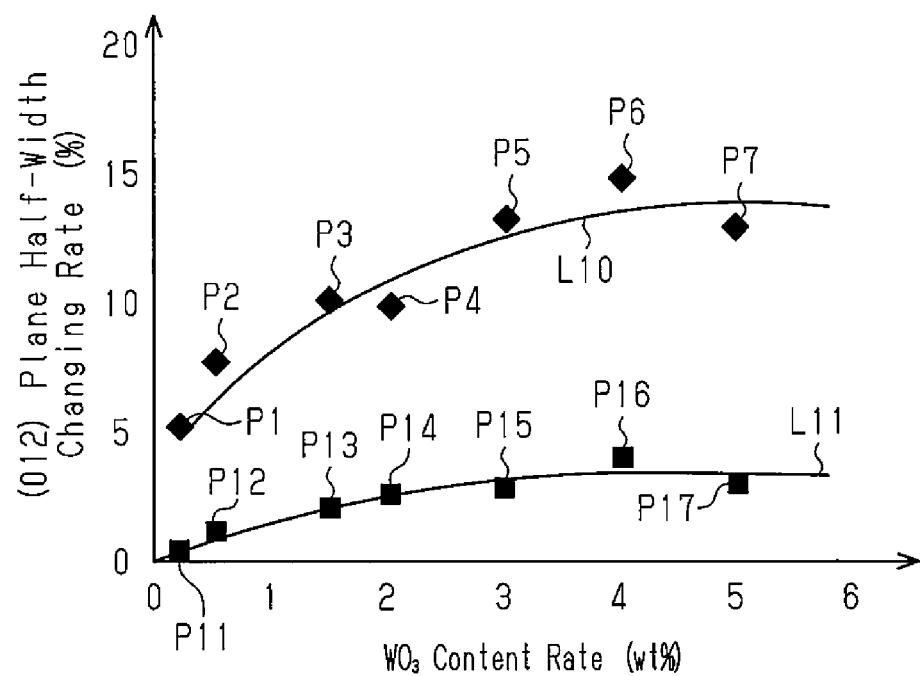
FIG. 5 is a graph schematically illustrating a half-width change rate of a peak derived from a (012) plane of cobalt oxyhydroxide when changing the content rate of tungsten oxide in the batteries of examples 1 to 7 and the batteries of comparative examples 1 to 7.

Further, in FIG. 5, curve L11 was plotted for comparative examples 1 to 7 along data points P11 to P17 defined by the content rate of tungsten oxide and the change rate of the half-width of a peak derived from a (012) plane. Data points P11 to P17 correspond to comparative examples 1 to 7, respectively.

In examples 1 to 7, the half-width change rate increases gradually at a lower increasing degree than the half-width change rate of examples 1 to 7. Accordingly, the crystallinity of cobalt oxyhydroxide derived from cobalt does not decrease just by including cobalt in the active material paste in advance. In other words, the crystallinity of cobalt oxyhydroxide including the coating layer is drastically decreased when cobalt oxyhydroxide derived from cobalt is deposited under a situation in which β-type cobalt oxyhydroxide and cobalt are both included in the active material paste and tungsten oxide is included in the electrolyte.

Then, the internal resistance of each of the initially charged nickel-metal hydride batteries of examples 11 to 17 and the internal resistance of the initially charged nickel-metal hydride battery of comparative example 18 were measured. The internal resistance measurement was performed by connecting each battery to a measurement circuit.

Figure 6:
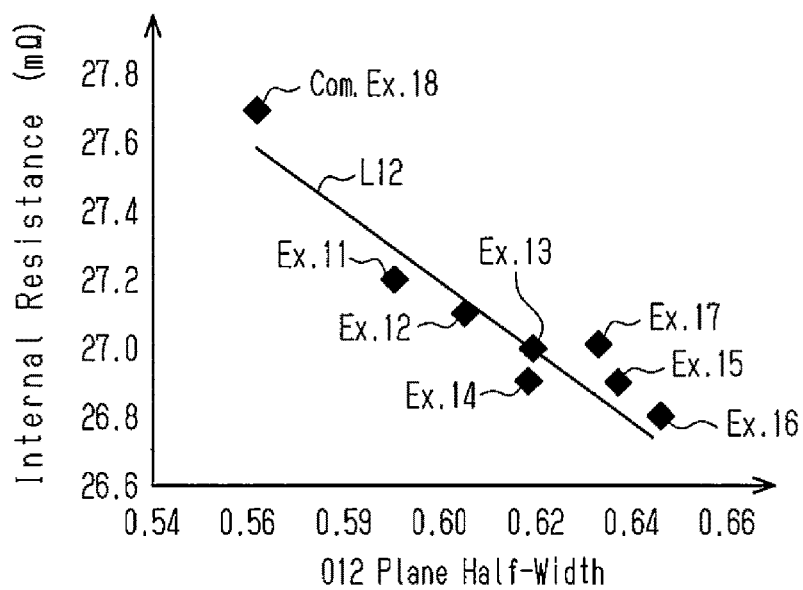
FIG. 6 is a graph schematically illustrating the battery internal resistance when changing the half-width of a peak derived from a (012) plane of cobalt oxyhydroxide in the nickel-metal hydride batteries of examples 11 to 17 and the nickel-metal hydride battery of comparative example 18.

FIG. 6 is a graph plotting the half-width of a peak derived from a (012) plane of cobalt oxyhydroxide and the internal resistance in examples 11 to 17 and comparative example 18. Line L12 optimizes a function obtained from the plotted points so that the difference between the plotted points is decreased. For the (012) plane half-widths of examples 11 to 17 and comparative example 18, the values of examples 1 to 7 and comparative example 8 were used since the conditions of cobalt oxyhydroxide and cobalt were the same. FIG. 6 illustrates that the internal resistance decreases as the (012) plane half-width increases.

Figure 7:
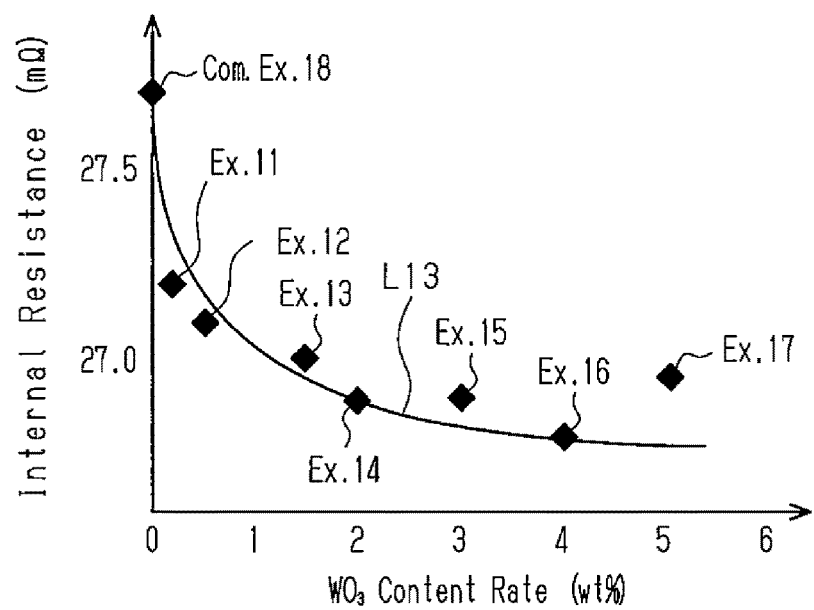
FIG. 7 is a graph schematically illustrating the battery internal resistance when changing the content rate of tungsten oxide in the nickel-metal hydride batteries of examples 11 to 17 and the nickel-metal hydride battery of comparative example 18.

In FIG. 7, curve L13 was plotted for examples 11 to 17 and comparative example 18 along data points defined by the content rate of tungsten oxide and the internal resistance of the nickel-metal hydride battery. FIG. 7 illustrates that the internal resistance decreases as the content rate of tungsten compounds increases.

The present embodiment has the advantages described below.

(1) The nickel-metal hydride battery is assembled using electrolyte that includes tungsten elements. The assembled battery is charged so that the cobalt in the positive electrode is deposited as cobalt oxyhydroxide. The positive electrode of the charged battery includes cobalt oxyhydroxide that is generated by the oxidation of cobalt and has low crystallinity. The coating layer that includes the cobalt oxyhydroxide, which has low crystallinity, forms a conductive network. The decrease in the crystallinity of cobalt oxyhydroxide, which is generated by the oxidation of cobalt and included in the coating layer, increases the conductivity of the conductive network in the positive electrode. This decreases the internal resistance of the alkaline battery. This effect is obtained by combining cobalt and cobalt oxyhydroxide and not obtained when using only cobalt, only cobalt oxyhydroxide, or a combination of other cobalt compounds.

(2) The electrolyte of the nickel-metal hydride battery includes tungsten elements. In an X-ray diffraction using CuKα radiation, the cobalt oxyhydroxide in the positive electrode has a peak of a (012) plane around "2θ=37° to 40°". The half-width of the peak of cobalt oxyhydroxide is 0.59° or greater. Thus, by decreasing the crystallinity of the cobalt oxyhydroxide in the coating layer, the conductivity of the conductive network in the positive electrode may be increased. This allows the internal resistance of the alkaline battery to be decreased.

(3) When manufacturing the nickel-metal hydride battery, the positive electrode is formed using positive electrode active material with a coating layer that includes β-type cobalt oxyhydroxide. The charging of the assembled battery decreases the resistance of the β-type cobalt oxyhydroxide in the coating layer. The amount of cobalt oxyhydroxide per unit area on the surface of nickel hydroxide particles is increased after the cobalt oxyhydroxide is charged as compared with before the cobalt oxyhydroxide is charged.

It should be apparent to those skilled in the art that the present invention may be embodied in many other specific forms without departing from the spirit or scope of the invention. Particularly, it should be understood that the present invention may be embodied in the following forms:

In the above embodiment, β-type cobalt oxyhydroxide is used as the cobalt oxyhydroxide. However, cobalt oxyhydroxide of a different crystal system may be used.

In the above embodiment, tungsten compound is included in the electrolyte. However, tungsten or a tungsten compound may be included in the positive electrode mixing material. In this case, for example, nickel hydroxide particles having the coating layer, cobalt, tungsten compounds, and an additive such as a thickening agent are kneaded to prepare a positive electrode active material paste. This also allows cobalt oxyhydroxide, which has a low crystallinity, to be deposited on the surface of the nickel hydroxide particles when accommodating the stacked body 25 in the integrated battery container 13 together with the electrolyte.

In the above embodiment, the electrolyte includes a tungsten compound. However, the negative electrode mixing material may include tungsten or a tungsten compound. Further, the electrolyte and the negative electrode mixing material may both include tungsten or a tungsten compound. In this case, for example, hydrogen-absorbing alloy particles and a tungsten compound are kneaded to prepare a negative electrode active material paste. This also allows cobalt oxyhydroxide, which has low crystallinity, to be easily deposited as ions of the tungsten compound reach the positive electrode through the electrolyte when accommodating the stacked body 25 in the integrated battery container 13 together with the electrolyte. However, when tungsten compound is included in only the positive electrode or the negative electrode, the half-width of (012) plane of the cobalt oxyhydroxide is affected after the ions of the tungsten compounds are dissolved in the electrolyte. Thus, when including the tungsten compound in the electrolyte, more ions of the tungsten compound directly affect the deposition of cobalt oxyhydroxide derived from cobalt. Accordingly, it is preferred that tungsten compound be included in the electrolyte.

The structure of the positive electrode plate 15 may be changed. For example, a based material formed by a three-dimensional porous body is used as the positive electrode plate 15. However, a base material having a structure other than a three-dimensional porous body such as a metal plate may be used instead.

In the above embodiment, the nickel-metal hydride battery (alkaline battery) includes the electrode plate unit 20 in which the electrode plates 15 and the negative electrode plates 16 are stacked with the separators arranged in between. Instead, for example, the alkaline battery may be a tubular battery that accommodates spirally wound positive electrode plates 15 and negative electrode plates 16 in a case together with electrolyte.

In the above embodiment, the alkaline battery is embodied in a nickel-metal hydride battery. Instead, the alkaline battery may be embodied in a nickel-cadmium battery, a zinc-nickel battery or the like.

In the above embodiment, the nickel-metal hydride battery (alkaline battery) is used as a power supply for a vehicle but may be used as a power supply for an electronic device or the like.

The present examples and embodiments are to be considered as illustrative and not restrictive, and the invention is not to be limited to the details given herein, but may be modified within the scope and equivalence of the appended claims.

The invention claimed is:

1. A method for manufacturing an alkaline battery, the method comprising:
assembling an alkaline battery with a positive electrode, a negative electrode, a separator, and an electrolyte, wherein the positive electrode includes cobalt and a positive electrode active material particle, which has a main component that is nickel hydroxide, the positive electrode active material particle has a coating layer that includes cobalt oxyhydroxide, and at least one of the positive electrode, the negative electrode, and the electrolyte includes a tungsten element; and charging the alkaline battery after the assembling so that the cobalt in the positive electrode is deposited as cobalt oxyhydroxide on a surface of the positive electrode active material particle, wherein a content rate of the tungsten element is set so that the cobalt oxyhydroxide included in the positive electrode has a peak in a (012) plane around "2θ=37° to 40°" in an X-ray diffraction using CuKα radiation and so that the peak has a half-width of 0.59° or greater.

2. The method according to claim 1, further comprising preparing the electrolyte by dissolving a tungsten compound in a solvent.

3. The method according to claim 1, further comprising forming the positive electrode using the positive electrode active particle, wherein the coating layer of the positive electrode active material particle includes cobalt oxyhydroxide that has a β-type crystal structure.

4. An alkaline battery comprising:

a positive electrode including a positive electrode active material particle, which has a main component that is nickel hydroxide;

a negative electrode;

a separator; and an electrolyte, wherein the positive electrode includes the positive electrode active material particle, which has a coating layer that includes cobalt oxyhydroxide, and cobalt oxyhydroxide derived from cobalt, which is oxidized in an initial charging, the cobalt oxyhydroxide included in the positive electrode has a peak in a (012) plane around "2θ=37° to 40°" in an X-ray diffraction using CuKα radiation, and the peak has a half-width of 0.59° or greater, and at least one of the positive electrode, the negative electrode, and the electrolyte includes a tungsten element.

* * * * *